United States Patent
Day

(10) Patent No.: US 7,266,189 B1
(45) Date of Patent: Sep. 4, 2007

(54) WHO SAID THAT? TELECONFERENCE SPEAKER IDENTIFICATION APPARATUS AND METHOD

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 229 days.

(21) Appl. No.: 10/352,339

(22) Filed: Jan. 27, 2003

(51) Int. Cl.
H04M 1/66 (2006.01)

(52) U.S. Cl. ................... 379/202.01; 379/158

(58) Field of Classification Search ............ 379/88.01, 379/157, 158, 159, 201, 207.01, 202.01, 379/20
See application file for complete search history.

(56) References Cited

U.S. PATENT DOCUMENTS

| | | | | |
|---|---|---|---|---|
| 5,450,481 | A * | 9/1995 | Penzias | 379/202.01 |
| 5,483,588 | A * | 1/1996 | Eaton et al. | 379/202.01 |
| 6,628,767 | B1 * | 9/2003 | Wellner et al. | 379/202.01 |
| 6,853,716 | B1 * | 2/2005 | Shaffer et al. | 379/202.01 |
| 2003/0081115 | A1 * | 5/2003 | Curry et al. | 348/14.12 |
| 2003/0081751 | A1 * | 5/2003 | Berstis | 379/202.01 |
| 2003/0125954 | A1 * | 7/2003 | Bradley et al. | 704/270 |
| 2004/0013252 | A1 * | 1/2004 | Craner | 348/14.12 |

OTHER PUBLICATIONS

Chen Liu et al. Localization of Multiple Sound Sources with Two Microphones Jun. 2000, The Journal of Acoustical Society of America, pp. 1888-1905.

Rabinkin et al. A DSP Implementation of Source Location Using Microphone Arrays Apr. 1996, The Journal of Acoustical Society of America, p. 2503.

* cited by examiner

Primary Examiner—Fan Tsang
Assistant Examiner—Olisa Anwah
(74) Attorney, Agent, or Firm—Marger Johnson & McCollom, P.C.

(57) ABSTRACT

The invention relates to an apparatus and method for identifying teleconference participants. More particularly, the invention relates to a conference system that includes an initialization means for initializing a call between participants located in at least two remote stations and an identification means for identifying one of the participants in one remote station responsive to a request from another of the participants in another remote station. The initialization means comprises table means for creating a table associating each of the participants to a position in a particular remote station and including a recorded voice segment of each of the participants. The identification means uses the table to identify the participant last to speak by looking up the position of the last speaker on the table and playing back the recorded voice segment of the participant associated with that position.

31 Claims, 6 Drawing Sheets

516

| | 550 | 552 | 554 |
|---|---|---|---|
| | 1 | $1_A$ | "BOB" |
| | | $1_B$ | "HI, I'M JANE" |
| | | $1_C$ | "UM, JOE" |
| | 2 | $2_A$ | "JOHN" |
| | | $2_B$ | "MARIE" |
| | ⋮ | ⋮ | ⋮ |
| | N | $N_A$ | "JIMMY" |
| | | $N_B$ | "JOE HERE" |
| | | $N_C$ | "MARK DAY" |

FIGURE 5

ahem.

WHO SAID THAT? TELECONFERENCE SPEAKER IDENTIFICATION APPARATUS AND METHOD

BACKGROUND OF THE INVENTION

1. Field of the Invention

The invention relates to a teleconference system that identifies remote speaking participants.

2. Description of the Related Art

Teleconference systems bring multiple parties together from remote locations. Ideally, teleconference systems allow participants to communicate with each other as if they were seated in the same room. A teleconference system includes at least two stations set up in remote rooms interconnected by a transmission system such as a global network or a telephone system.

Participants at each of the stations communicate with each other through audio equipment. Audio equipment for each station typically includes one or more microphones, speakers, and the like. The microphones pick up participants' voices in the first station and generate an audio signal that is transmitted via the transmission system to the second, remote, station. The speakers reproduce and amplify the audio signal transmitted from the first to the second station.

Teleconference systems have audio drawbacks. Often, participants have trouble distinguishing unfamiliar voices of remote participants. A common experience is an off line canvassing of others in a first station—who said that?—after hearing an unfamiliar voice from a remote participant in a second station.

Managed teleconference calls such as a corporate earnings call typically have an operator that identifies participants before they speak. Such an arrangement ensures smooth transitions between participants. Managed teleconference calls, however, are expensive and onerous for typical ad hoc meetings with remote participants.

Accordingly, a need remains for an improved telephone conference system that identifies remote speaking participants.

BRIEF DESCRIPTION OF THE DRAWINGS

The foregoing and other objects, features, and advantages of the invention will become more readily apparent from the detailed description of invention embodiments that reference the following drawings.

FIG. 5 is a block diagram of the table shown in FIG. 1.

DETAILED DESCRIPTION OF THE PREFERRED EMBODIMENT

Figure 1:
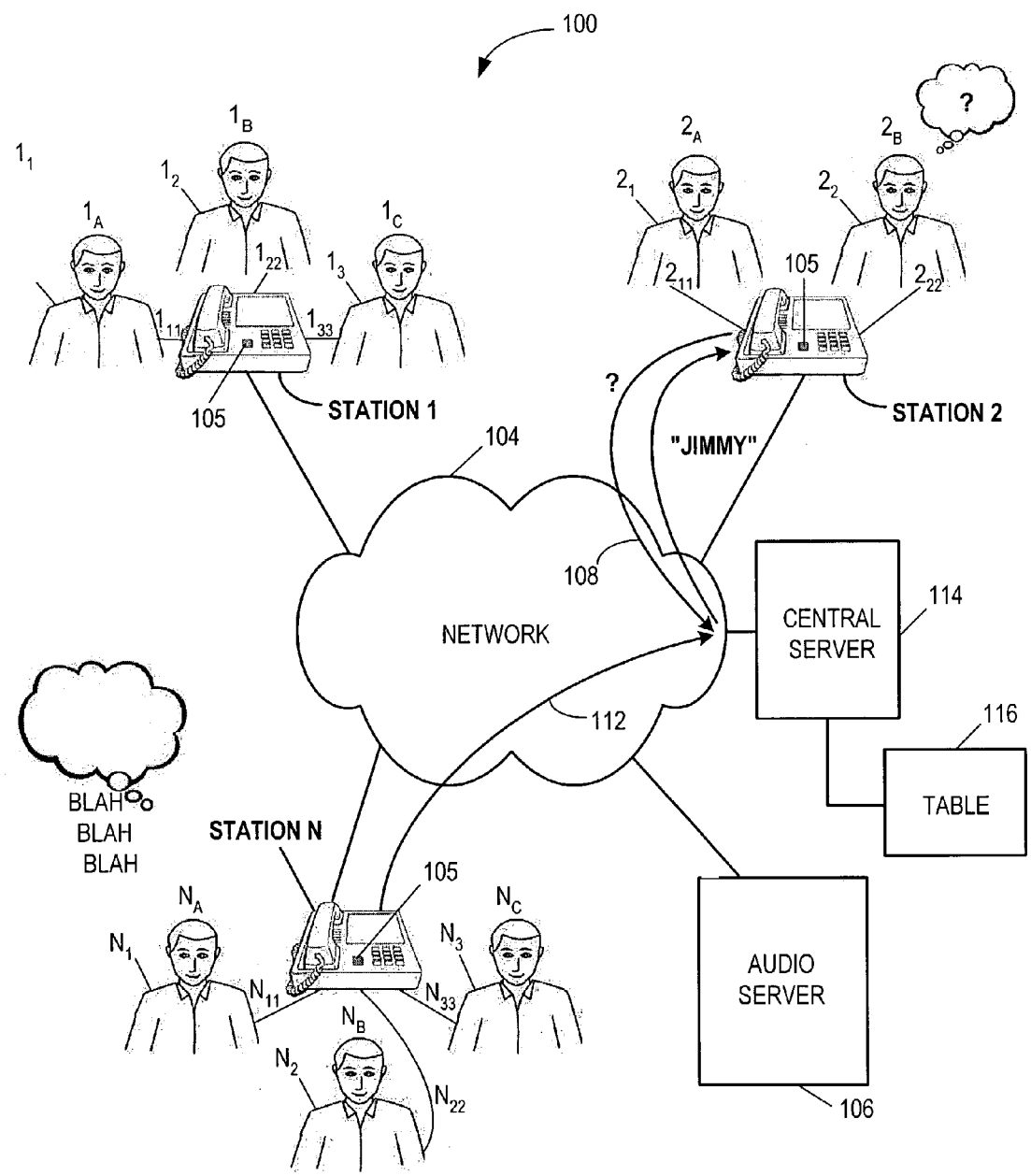
FIG. 1 is a diagram of a teleconference system.

FIG. 1 is a diagram of a teleconference system $100$. Referring to FIG. 1, the system $100$ includes a plurality of stations $1, 2, \ldots, N$. Each station is geographically distant or distinct from other stations. For example, station $1$ might be located in an office building in San Jose, Calif.; station $2$ might be located in another office building in San Jose; and station $N$ might be located in Portland, Oreg. Stations $1, 2, \ldots, N$ might be for example conventional analog or digital conference phones modified as described below. The design and operation of conventional conference phones are well known and will not be discussed in further detail. A person of reasonable skill in the art should understand that stations $1, 2, \ldots, N$ might have other embodiments that come within the scope of the present invention.

A person of reasonable skill in the art should recognize that any number of stations in any number of locations comes within the scope of the invention. A person of reasonable skill in the art should recognize that stations located in geographically distant locations refers to stations located different parts of the same building, different buildings, cities, states, countries, and the like.

A number of conference participants associate with a corresponding station through corresponding connections. For example, participants $1_1$, $1_2$, and $1_3$ associate with station $1$ (e.g., in a first building in San Jose) through connections $1_{11}$, $1_{22}$, and $1_{33}$, respectively. Participants $2_1$ and $2_2$ associate with station $2$ (e.g., in a second building in San Jose) through connections $2_{11}$ and $2_{22}$, respectively. And participants $N_1$, $N_2$, and $N_3$ associate with station $N$ (e.g., in Portland) through connections $N_{11}$, $N_{22}$, and $N_{33}$, respectively. A person of reasonable skill in the art should recognize that any number of participants might associate with any given station. A person of reasonable skill in the art should recognize that the connections might be hardwired or virtual. An example of a hardwired connection is where participant $1_1$ connects to station $1$ through earphones. An example of a virtual connection is where participant $2_1$ connects to station $2$ via sound waves picked up by one of more microphones mounted on station $2$. A person of reasonable skill in the art should recognize other possibilities of hardwired or virtual connections exist that come within the scope of the present invention.

Stations $1, 2, \ldots, N$ determine the particular position of its associated participants when each participant speaks. For example, station $1$ determines that participants $1_1$, $1_2$, and $1_3$ are located at positions $1_A$, $1_B$, and $1_C$, respectively. Station $2$ determines that participants $2_1$ and $2_2$ are located at positions $2_{11}$ and $2_{22}$, respectively. And station $N$ determines that participants $N_1$, $N_2$, and $N_3$ are located at positions $N_A$, $N_B$, and $N_C$, respectively.

Stations $1, 2, \ldots, N$ determine the position of the current speaking participant using well known technology, including a radial coordinate (r, theta) system. In one embodiment, stations $1, 2, \ldots, N$ determine the current speaking participant's position or angle relative to the station using a radial array of directional microphones positioned within the corresponding stations $1, 2, \ldots, N$. In another embodiment, stations $1, 2, \ldots, N$ might localize multiple sound sources using two microphones as described by Chen Liu and others in a paper titled "Localization Of Multiple Sound Sources With Two Microphones," published in 2000 in The Journal of the Acoustical Society of America, volume 108, number 4, pages 1888-1905. In yet another embodiment, stations $1, 2, \ldots, N$ determine the current speaking participant's location using a microphone array as described by Rabinkin and others in a paper titled "A DSP Implementation of Source Location Using Microphone Arrays," published April 1996 in The Journal of the Acoustical Society of America, volume 99, number 4, part 2, page 2503.

The stations $1, 2, \ldots, N$ include a request means $105$ that a participant activates to transmit a request $108$ to a central server $114$ via the network $104$. The request $108$ asks the server $114$ to identify the participant last to speak. The request means 105 might be a dedicated button mounted on the station that a participant pushes to transmit the request 108 to the server 114. The request means 105 might alternatively be a sequence of preprogrammed button presses on a conventional conference phone. A person of reasonable skill in the art should recognize any number of request means 105 that might be used to enable a participant to send a request 108 to the server 114.

The stations transmit their corresponding participants' speech through a network 104 such that participants located in geographically distant locations (e.g., San Jose to Portland) communicate with each other. The network 104 might be a digital network such as an Internet Protocol (IP) network that digitally transports information packets from a destination to a source. In one embodiment, the network 104 carries the audio portion of the call via, e.g., Voice Over Internet Protocol (VoIP). Or the network 104 might be an analog network such as a telephone network, e.g., a Private Branch Exchange (PBX) or a public telephone network that transports analog signals from a destination to a source.

The teleconference system 100 includes an audio server 106 and the central server 114. A person of reasonable skill in the art should recognize that the central server 114 might be part of or completely separate from the audio server 106. The audio server 106 initializes, maintains, and controls the conference call between the stations 1, 2, . . . , N through the network 104. The design and operation of the audio server 106 is well known and will not be discussed in further detail.

Figure 2:
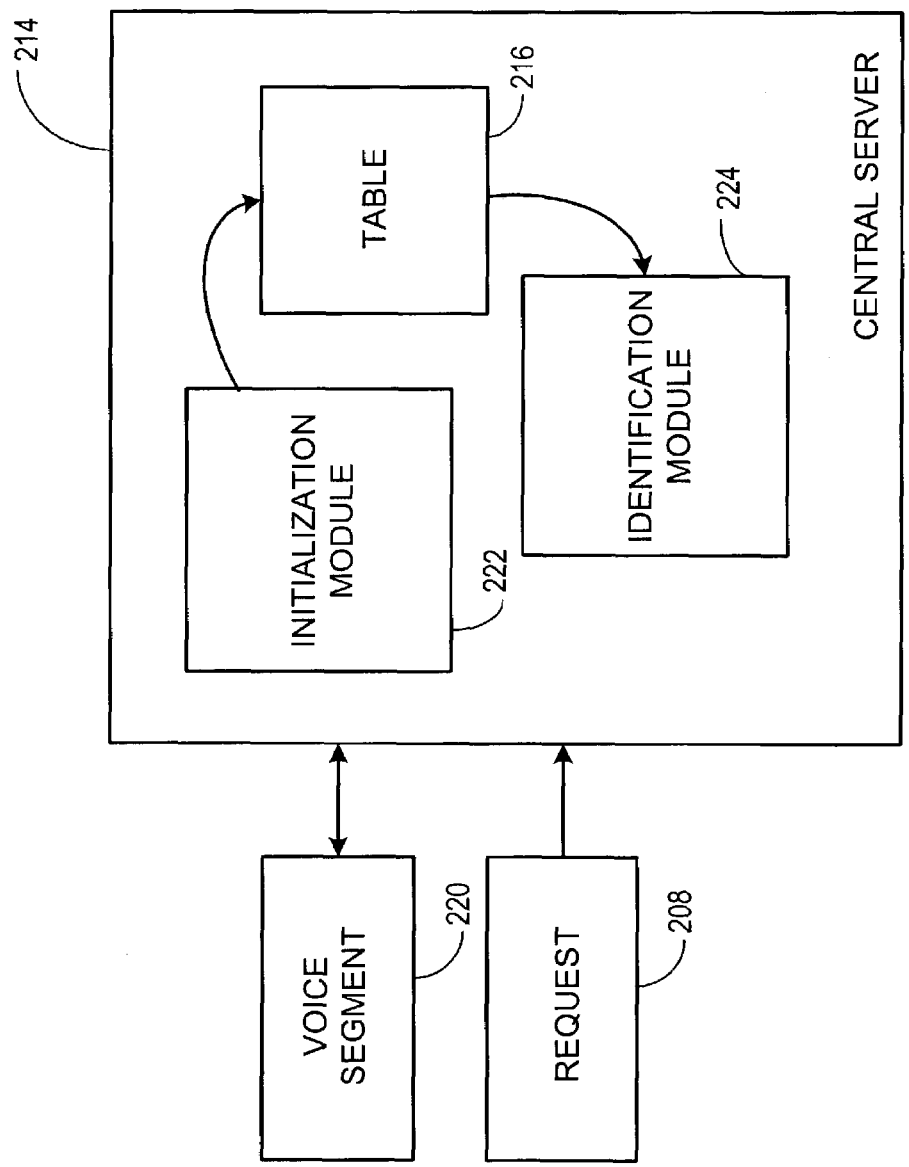
FIG. 2 is a block diagram of the central server shown in FIG. 1.

FIG. 2 is a block diagram of the central server 114 shown in FIG. 1. Referring to FIG. 2, the central server 214 receives a request 208 to identify the participant last to speak. The central server 214 includes an initialization module 222 and an identification module 224. The initialization module 222 creates a table 216 (116 in FIG. 1) that the identification module 224 uses to respond to the request 208. During conference call initialization, the initialization module 222 builds the table 216 by adding a recorded voice segment 220 of each call participant at each of the stations 1, 2, . . . , N to the table 216.

Figure 3:
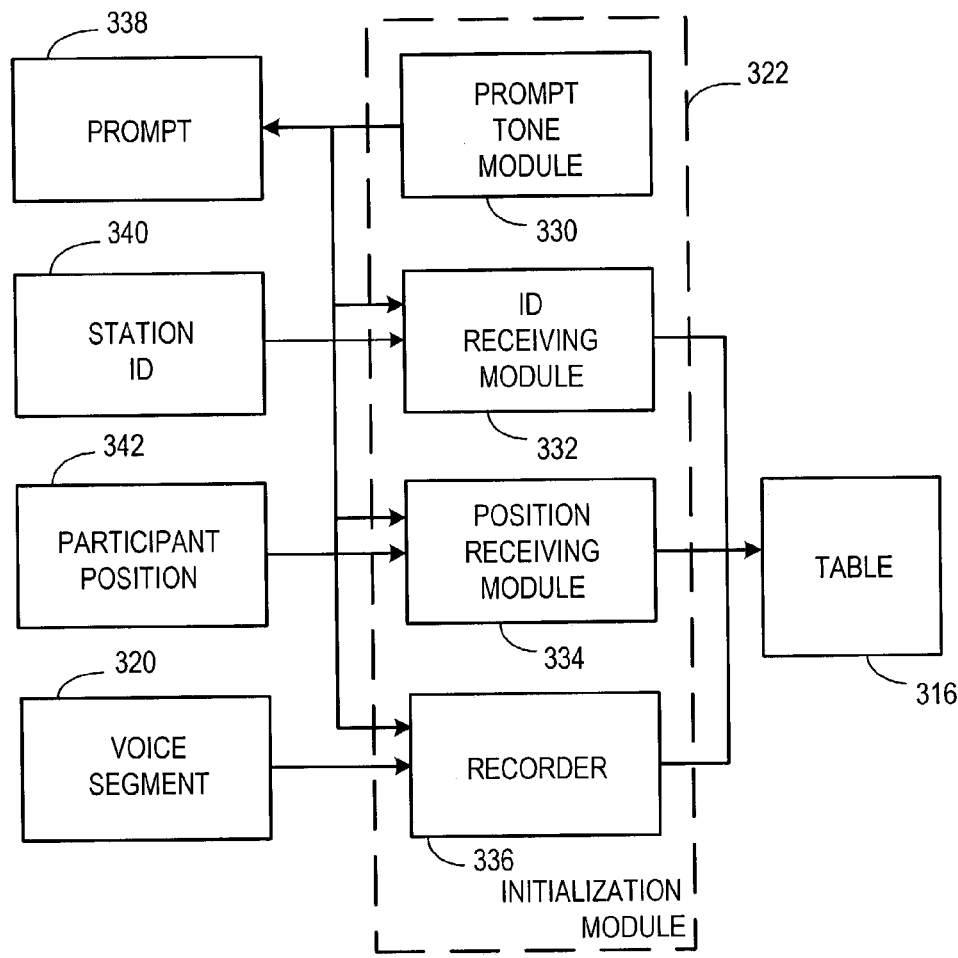
FIG. 3 is a block diagram of the initialization module shown in FIG. 2.

FIG. 3 is a block diagram of the initialization module 222 shown in FIG. 2. Referring to FIGS. 1-3, the initialization module 322 initiates a roll call process for each connected station. The initialization module 322 includes station identification receiving module 332 for receiving a station identification 340 from each station included in the conference call. A prompt tone module 330 sequentially sends a start recording prompt 338 (e.g., a tone, explicit recording instruction, light, and the like) to each of the stations 1, 2, . . . , N included in the conference call. Responsive to the start recording prompt 338, each station, e.g., station 1, sends a speaker prompt (not shown separately) to each of its associated participants, e.g., $1_1$, $1_2$, and $1_3$, through a corresponding connection, e.g., $1_{11}$, $1_{22}$, and $1_{33}$, respectively. Each participant, e.g., participants $1_1$, $1_2$, and $1_3$, records a voice segment 320. A recorder 336 records the voice segment 320.

Almost simultaneously with each participant recording its voice segment 320, the station, e.g., station 1, determines the position 342, e.g., $1_A$, $1_B$, and $1_C$, of each of its associated participants, e.g., $1_1$, $1_2$, and $1_3$, respectively, using any of the methods described above. A person of reasonable skill in the art should recognize that the station or the central server should have a reasonable amount of audio storage (not shown separately) to buffer the voice segment 320 from a speaker until the station is able to determine the position of the participant. Once the station determines a position, it provides its participants' positions 342 to a position-receiving module 334 included in the initialization module 322.

FIG. 5 is an embodiment of the table 316 shown in FIG. 3. Referring to FIG. 5, a table 516 includes a plurality of columns and rows indicating the number of stations and associated participants to the conference call. The table 516 includes a column 550 identifying the station, a column 552 identifying the participant position, and a column 554 containing the recorded voice segment 308 (FIG. 3) of the corresponding participant. For the example conference call shown in FIG. 1, station 1 includes participants $1_1$, $1_2$, and $1_3$ further identified by their recorded voice messages contained in column 554. Participant 1, recorded "Bob." Participant 12 recorded "Hi, I'm Jane." And participant 13 recorded "Um, Joe."

Once all the participants at a prompted station have recorded their corresponding voice segments, the prompt tone module 330 sends a prompt to a next station, e.g., station 2. Station 2 determines the position $2_A$ and $2_B$ of each of its participants $2_1$ and $2_2$, respectively. Each participant provides it voice segment 320 to the recorder 336. Participant $2_1$ records "John" and participant 22 records "Marie." Other participants at other stations recorded voice segments as shown in table 516. The initialization module 322 detects conference entry and conference exit tones that collide with a participant speaking. When this occurs, the initialization module 322 scrubs the recording just made and re-prompts the participant. The initialization module 322 terminates the roll call process responsive to a signal from the station, e.g., a key press such as #. A person of reasonable skill in the art should recognize that roll call termination might be implicit, e.g., by the detected silence after a speaker prompt (prompting a participant) or by the detected silence after a start recording prompt 338 (prompting a station).

Referring to FIG. 1, the central server 114 receives and records an ongoing stream 112 of station identification (340 in FIG. 3) and participant position (342 in FIG. 3) information from the stations connected to the call. Each station contributes such an item to the server whenever it believes that it has an active, speaking, participant. At any point, a participant (e.g., participant $2_1$) makes a request 108 to the central server 114 to identify the participant who last spoke (e.g., participant $N_1$). The request 108 is made using a request means 105 included in the station. For example, participant $2_1$ presses a "who said that?" button 105 on station 2.

Figure 4:
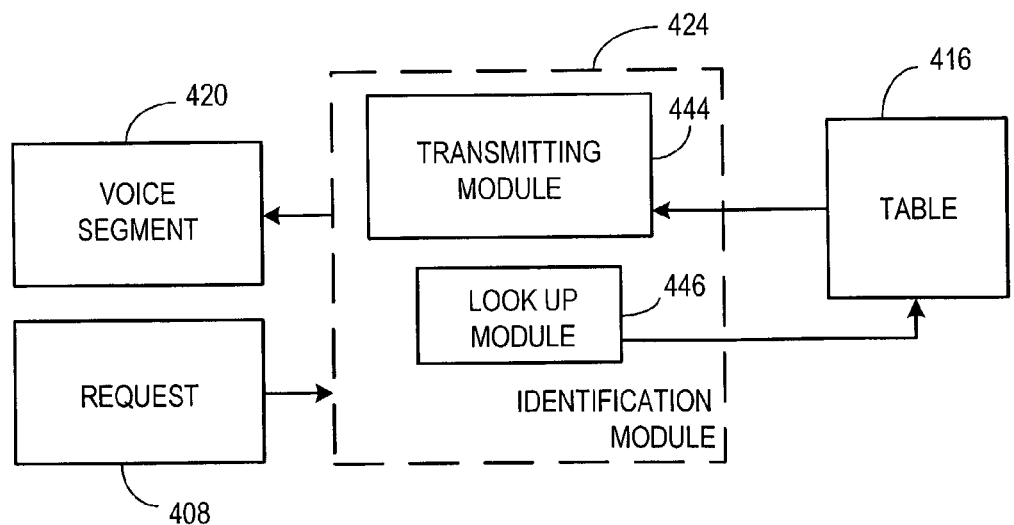
FIG. 4 is a block diagram of the identification module shown in FIG. 2.

Referring to FIGS. 2 and 4, an identification module 424 in the central server 214 receives the request 408. Since the table 416 is continuously updated with the position of the participant last to speak by a continuous stream of updated information, e.g., stream 112, look up module 446 looks up the identity of the participant last to speak in the table 416 responsive to the request 408. The transmitting module 444 transmits and plays the recorded voice segment 420 of the participant last to speak to the enquiring participant as indicated by the table 416. In the example shown in FIG. 1, the central server 114 responds to the request 108 from participant 22 with the recorded voice segment of participant $N_1$, that is, the central server 114 responds with "Jimmy."

In one embodiment, the central server 114 provides the enquiring participant with a list of recent stations and positions of participants who recently spoke through the network 104. The enquiring participant can then select (e.g., by using a web browser or other such tool) the participant's position and the server 114 transmits and plays back the voice segment associated with the selected participant. By doing so, the enquiring participant is not necessarily limited to only enquiring about a last speaker but has a list of recent speakers from which to chose. Such an interface can also allow the enquiring participant to set up filters. For example, the enquiring participant can provide nicknames for particular station/position pairs or filter those out, such that frequent or familiar speaking participants are ignored in the list and the unfamiliar ones more readily identified.

One embodiment of the system 100 involves ordinary telephones. A particular touch-tone or preprogrammed key presses can be designated as the request means 105. The server 114 would treat the phone as a single party conference station. The telephone itself will not send the relevant information to the central server 114, nor will it determine a participant's position. The audio server 106 might be able to perform these functions for it. In this situation, the audio server 106 transmits station identification and a value (e.g., 0) indicating the direction of the participant at that station to the server 114. The server 114 treats this single person station in the same way as any other type of station, particularly during initialization and operation.

Figure 6A:
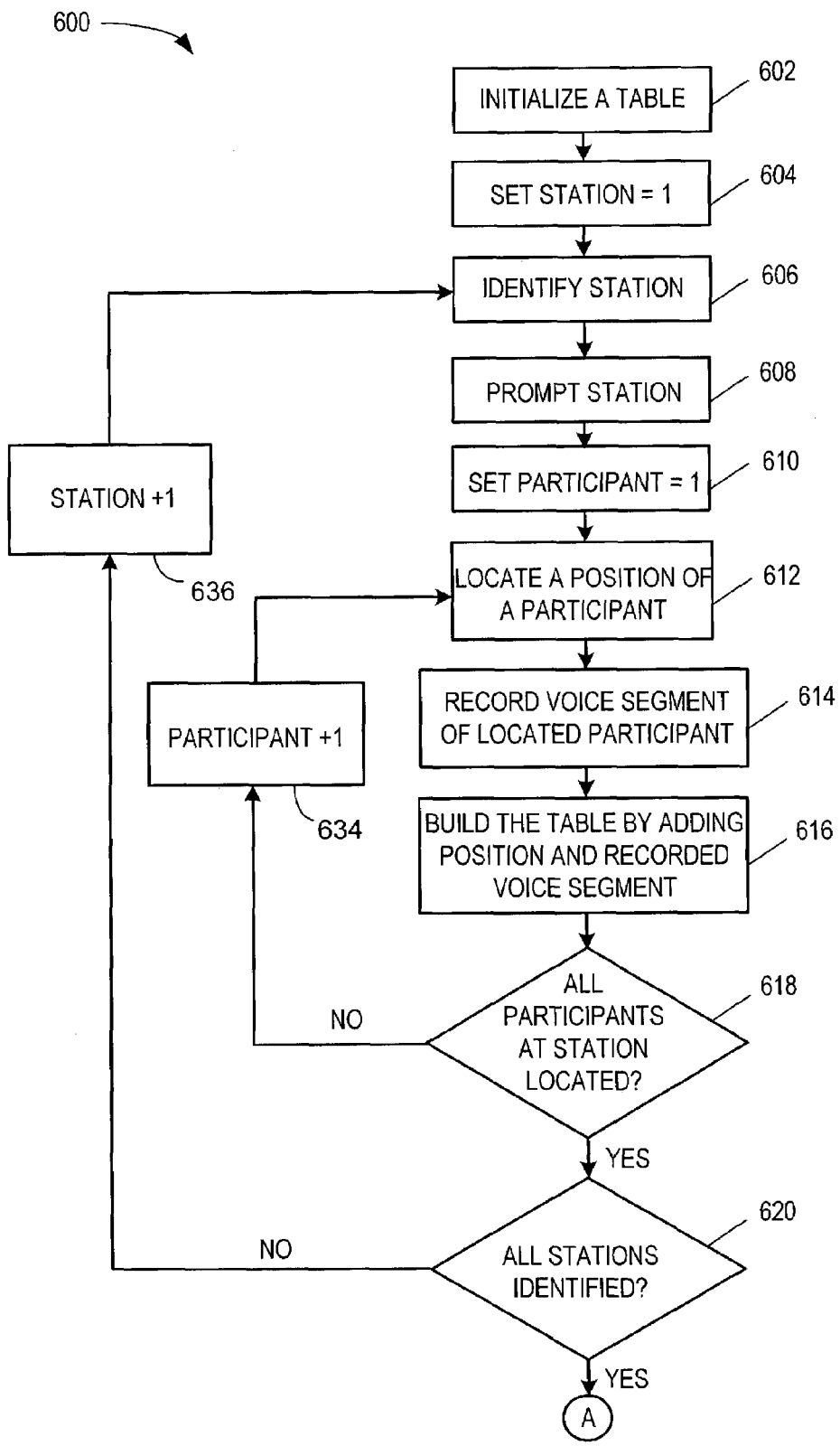
FIGS. 6A-B is a flow diagram of a teleconferencing method.
Figure 6B:
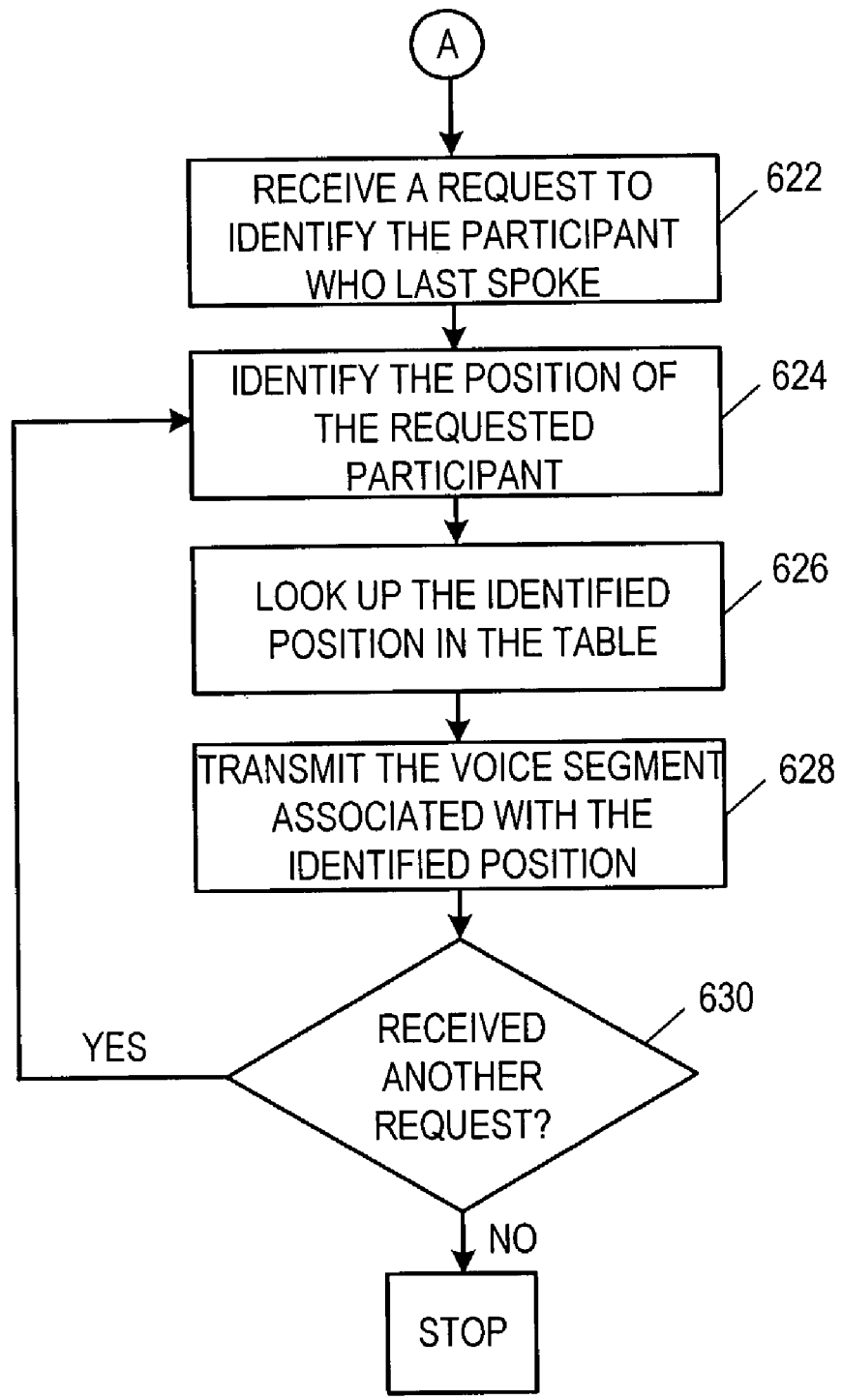

FIGS. 6A-B is a flow diagram of a teleconferencing method. Referring to FIGS. 6A-B, a central server initializes a table at 602. The central server initiates the roll call process by identifying a first station at 604 and 606. The server prompts the first station at 608 and locates the position of a first participant at 610 and 612. The server prompts the first participant to record a voice segment 614. The server builds the table by adding the position and recorded voice segment of the participant at 616. The server determines whether it has identified all of the participants at the first station. If not, the server locates the next participant at 612 and 634. The server continues this process until all of the participants at the first station have been located and identified. The server determines whether all of the stations have been processed. If not, the server identifies the next station 606 and 636. The server continues this process until the roll call is complete (or terminated) and all of the participants at each of the stations have been located and identified. As explained earlier, a key press can terminate the roll call process at any station. The server receives a request to identify a participant last to speak at 622. Since the server receives a continuous stream of position/station identification information relating to the current speaker, it can identify the position of the last speaking participant (624) and look up the voice segment associated with the participant at that position/station (626). At 628, the server transmits and plays back the recorded voice segment of the participant associated with the identified position. The server processes all such requests (630) until the conference call terminates or no more requests are received.

Having illustrated and described the principles of our invention, it should be readily apparent to those skilled in the art that the invention can be modified in arrangement and detail without departing from such principles. I claim all modifications coming within the spirit and scope of the accompanying claims.

I claim:

1. A teleconference apparatus, comprising:
   initialization means for initializing a call between a plurality of first participants located in a first station calling on a first line and at least one second participant located in a second station calling on a second line, the first station being remote from the second station; and
   identification means for identifying a position of at least one of the plurality of first participants in the first station on the first line responsive to a request from the at least one second participant in the second station, where the at least one second participant initiates the request each time the at least one second participant requests identification of the position of the at least one of the plurality of first participants located in the first station after initializing the call and where the identification means does not continuously display a list of participants last to speak from the plurality of first participants and the at least one second participant and where the identification means does not continuously receive and is not continuously aware of the identity of the last participant to speak;
   where the initialization means includes means for determining a position corresponding to each of the first and second participants in the first and second stations, respectively;
   where the identification means determines the identity of the at least one of the plurality of first participants responsive to the request and by associating the at least one of the plurality of first participants with their position;
   where the initialization means comprises table means for creating a table associating each of the first participants and the at least one second participant to their position in the first and second stations, respectively;
   where the identification means uses the table to identify the at least one first participant; and
   where the table is a random access memory.

2. A teleconference apparatus comprising:
   initialization means for initializing a call between a plurality of first participants located in a first station calling on a first line and at least one second participant located in a second station calling on a second line, the first station being remote from the second station; and
   identification means for identifying a position of at least one of the plurality of first participants in the first station on the first line responsive to a request from the at least one second participant in the second station, where the at least one second participant initiates the request each time the at least one second participant requests identification of the position of the at least one of the plurality of first participants located in the first station after initializing the call and where the identification means does not continuously display a list of participants last to speak from the plurality of first participants and the at least one second participant and where the identification means does not continuously receive and is not continuously aware of the identity of the last participant to speak;
   where the initialization means includes means for determining a position corresponding to each of the first and second participants in the first and second stations, respectively;
   where the identification means determines the identity of the at least one of the plurality of first participants responsive to the request and by associating the at least one of the plurality of first participants with their position;
   where the initialization means comprises:
      means for receiving a station identification identifying the first and second stations; and
      recording means for recording a voice segment corresponding to each of first and second participants in each of the first and second stations.

3. The teleconference apparatus of claim 2
   where the initialization means comprises table means for creating a table associating each of the first participants and the at least one second participant to their position in the first and second stations, respectively; and where the identification means uses the table to identify the at least one first participant.

4. The teleconference apparatus of claim 2 where the initialization means comprises station prompt means for sequentially transmitting a station prompt to the first and second stations; and where the means for determining a participant position and the recording means operate responsive to the station prompt.

5. The teleconference apparatus of claim 2 where the identification means transmits the voice segment associated with a participant last to speak responsive to the request.

6. The teleconference apparatus of claim 2 comprising first transmitting means for transmitting a list of positions and stations corresponding to participants who have recently spoken;

selecting means for receiving a prompt requesting a position and station associated with one of the participants who have recently spoken; and second transmitting means for transmitting the voice segment corresponding to the participant associated with the requested position and station.

7. The teleconference apparatus of claim 2 where the identification means determines the identity of a plurality of participants last to speak; and where the identification means includes a filtering means to filter out at least one participant from the identified plurality of participants last to speak.

8. A call conference apparatus comprising:

an initialization module to initialize a call between a plurality of first participants in a first station calling on a first line and a plurality of second participants in a second station calling on a second line, the initialization module including a position identification module to associate a position with each of the first and second participants; and an identification module to identify a last speaking participant of the first participants on the first line responsive to a request from one of the second participants on the second line, the identification module identifying the last speaking participant by identifying the position of the last speaking participant, where the one of the second participants initiates the request each time the one of the second participants requests identification of the position of at least one of the first participants located in the first station after initializing the call and where the identification module does not continuously display a list of participants last to speak from the plurality of first participants and the plurality of second participants and where the identification module does not continuously receive and is not continuously aware of the identity of the last participant to speak;

where the initialization module and the identification module are part of a server;

where the initialization module is adapted to create a table associating each of the first and second participants to their associated position in the first and second stations, respectively;

where the identification module is adapted to use the table to identify the last speaking participant; and where the table is a random access memory.

9. A call conference apparatus comprising:

an initialization module to initialize a call between a plurality of first participants in a first station calling on a first line and a plurality of second participants in a second station calling on a second line, the initialization module including a position identification module to associate a position with each of the first and second participants; and an identification module to identify a last speaking participant of the first participants on the first line responsive to a request from one of the second participants on the second line, the identification module identifying the last speaking participant by identifying the position of the last speaking participant, where the one of the second participants initiates the request each time the one of the second participants requests identification of the position of at least one of the first participants located in the first station after initializing the call and where the identification module does not continuously display a list of participants last to speak from the plurality of first participants and the plurality of second participants and where the identification module does not continuously receive and is not continuously aware of the identity of the last participant to speak;

where the initialization module and the identification module are part of a server;

where the initialization module receives a station identification identifying the first and second stations and determines the positions corresponding to each of the first and second participants; and where the initialization module is adapted to record a voice segment corresponding to each of the first and second participants.

10. The call conference apparatus of claim 9 where the initialization module is adapted to create a table associating each of the first and second participants to their associated position in the first and second stations, respectively; and wherein the identification module is adapted to use the table to identify the last speaking participant.

11. The call conference apparatus of claim 9 where the identification module is adapted to transmit the voice segment associated with a participant last to speak responsive to the request.

12. The call conference apparatus of claim 9 where the identification module comprises:

a first transmitting module for transmitting a list of positions and stations corresponding to the first and second participants who have recently spoken;

a receiving module for receiving a requested position and station associated with one of the first or second participants who have recently spoken; and a second transmitting module for transmitting the voice segment corresponding to the participant associated with the requested position and station.

13. A call conference apparatus, comprising:

an initialization module to initialize a call between a plurality of first participants in a first station calling on a first line and a plurality of second participants in a second station calling on a second line, the initialization module including a position identification module to associate a position with each of the first and second participants; and an identification module to identify a last speaking participant of the first participants on the first line responsive to a request from one of the second participants on the second line, the identification module identifying the last speaking participant by identifying the position of the last speaking participant, where the one of the second participants initiates the request each time the one of the second participants requests identification of the position of the last speaking participant of the first participants located in the first station after initializing the call and where the identification module is configured to not continuously display a list of participants last to speak from the plurality of first participants and the plurality of second participants;

where the identification module is configured to not continuously receive and not continuously be aware of the identity of the last participant to speak;

where the initialization module and the identification module are part of a server;

where the initialization module comprises a prompt module adapted to generate and sequentially transmit a station prompt to the first and second stations; and where the initialization and identification modules are adapted to operate responsive to the station prompt.

14. A conference station, comprising:

initialization means for initializing a conference call between conference participants located at the conference station calling on a first line and remote participants located in a remote station calling on a second line, the conference and remote station being geographically distant from each other, the initialization means including a position identification means to associate a position with each of the conference and remote participants;

identification means for identifying each of the conference and remote participants calling on the first and second lines, respectively, by associating their corresponding position in their corresponding station responsive to a request from one of the conference or remote participants, where the conference or remote participants initiates the request each time the conference or remote participants requests identification of the position of any of the other conference or remote participants after initializing the conference call and where the identification means does not continuous display a list of participants last to speak from the conference participants and the remote participants and where the identification means does not continuously receive and is not continuously aware of the identity of the last participant to speak; and request means for requesting identification of the position associated with at least one of the remote participants to the identification means;

where the identification means comprises:

voice segment transmitting means for transmitting a voice segment associated with each of the conference and remote participants to a central server using the first and second lines, respectively.

15. The conference station of claim 14 where the initialization means comprises station identification transmitting means for transmitting a conference station identifier to a central server.

16. The conference station of claim 14 where the initialization means comprises tone receiving means for receiving a tone prompt from the central server; and where the station identification transmitting means, the positioning means, and the voice segment transmitting means operate responsive to the tone receiving means.

17. The conference station of claim 14 where the request means is a button.

18. The conference station of claim 14 comprising:

a browsing means for browsing a list of positions and stations corresponding to conference and remote participants who have recently spoken;

selecting means for selecting a position and a station associated with one of the conference and remote participants who have recently spoken; and selection transmission means for transmitting the selected position and station to a central server.

19. A method comprising:

initializing a conference call between a plurality of first participants in a first station calling on a first line and at least one second participant in a second station calling on a second line, the first station being remote from the second station;

determining a position associated with the first participants and the at least one second participant;

receiving an identification request requesting identification of a participant last to speak at the first station from a participant at the second station, where the at least one second participant initiates the request each time the at least one second participant requests identification of the position of any of the first participants located in the first station after initializing the call; and identifying the participant last to speak responsive to the request by identifying its position, where the identifying does not continuously display a list of participants last to speak from the plurality of first participants and the at least one second participant and where the identifying does not continuously receive and is not continuously aware of the identity of the last participant to speak;

where the initializing, receiving, and identifying occur at a central server operatively coupled to the first and second stations; and where initializing comprises:

sequentially prompting each of the first and second stations for information relating to its corresponding first and at least one second participants using the first and second lines, respectively; and providing information relating to the first and at least one second participants responsive to the prompt.

20. The method of claim 19 where providing information comprises:

providing a position associated with each of the first and at least one second participants at the first and second stations, respectively; and recording a voice segment associated with each of the first and at least one second participants at the first and second stations.

21. The method of claim 19 where initializing comprises building a table.

22. The method of claim 21 where the table identifies the first and second stations and records a voice segment associated with each participant at each of the first and second stations.

23. The method of claim 19 where receiving an identification request includes pushing a button on one of the first and second stations.

24. The method of claim 19 where identifying the participant last to speak comprises transmitting a recorded voice segment of the participant last to speak on either the first or second line.

25. The method of claim 19 where identifying the participant last to speak comprises:

browsing a list of positions and stations corresponding to participants who have recently spoken;

selecting a position and a station associated with the participants who have recently spoken; and transmitting a voice segment corresponding to the selected position and station.

26. An article comprising a machine-accessible medium having associated data that, when accessed, results in a machine:

initializing a conference call between first participants at a first station calling on a first line and second participants at a second station calling on a second line, the first station being remote from the second station;

determining a position associated with the first participants and the at least one second participant;

receiving an identification request for a participant last to speak at the first station from a participant at the second station, where any of the second participants initiates the request each time the any second participant requests identification of the position of any of the first participants located in the first station after initializing the conference call; and identifying the participant last to speak responsive to the request by identifying its position, where the identifying does not include continuously displaying a list of participants last to speak from the first participants and the second participants and where the identifying does not include continuously receiving and continuously be aware of the identity of the last participant to speak;

where the initializing, receiving, and identifying occur at a server operatively coupled to the first and second stations;

sequentially prompting each of the participants at the first and second stations using the first and second lines, respectively; and recording a voice segment associated with each participant at the first and second stations responsive to the prompt.

27. The article of claim 26 where initializing comprises building a table.

28. The article of claim 27 where the table identifies the first and second stations, identifies a position associated with each participant at each of the first and second stations, and records a voice segment associated with each participant at each of the first and second stations.

29. The article of claim 26 where receiving an identification request includes pushing a button on the first or second stations.

30. The article of claim 26 where identifying the participant last to speak comprises transmitting a recorded voice segment of the participant last to speak.

31. The method of claim 26 where identifying the participant last to speak comprises:

browsing a list of positions and stations corresponding to participants who have recently spoken;

selecting a position and a station associated with one of the participants who have recently spoken; and transmitting a voice segment corresponding to the selected position and station.

* * * * *